US012553544B2

(12) United States Patent
Matsumoto et al.

(10) Patent No.: US 12,553,544 B2
(45) Date of Patent: Feb. 17, 2026

(54) ELECTRIC RESISTANCE WELDED STEEL PIPE, METHOD FOR PRODUCING THE SAME, LINE PIPE, AND BUILDING STRUCTURE

(71) Applicant: JFE Steel Corporation, Tokyo (JP)

(72) Inventors: Akihide Matsumoto, Tokyo (JP); Shinsuke Ide, Tokyo (JP); Takatoshi Okabe, Tokyo (JP)

(73) Assignee: JFE Steel Corporation, Tokyo (JP)

(*) Notice: Subject to any disclaimer, the term of this patent is extended or adjusted under 35 U.S.C. 154(b) by 625 days.

(21) Appl. No.: 17/771,864

(22) PCT Filed: Oct. 2, 2020

(86) PCT No.: PCT/JP2020/037650
§ 371 (c)(1),
(2) Date: Apr. 26, 2022

(87) PCT Pub. No.: WO2021/085036
PCT Pub. Date: May 6, 2021

(65) Prior Publication Data

US 2022/0373108 A1 Nov. 24, 2022

(30) Foreign Application Priority Data

Oct. 31, 2019 (JP) ................................ 2019-198508

(51) Int. Cl.
*C21D 8/10* (2006.01)
*B21C 37/08* (2006.01)
(Continued)

(52) U.S. Cl.
CPC ................ *F16L 9/17* (2013.01); *B21C 37/08* (2013.01); *C21D 8/105* (2013.01); *C21D 8/1222* (2013.01);
(Continued)

(58) Field of Classification Search
CPC ........ C21D 2211/002; C21D 2211/005; C21D 8/0226; C21D 8/0263; C21D 8/105;
(Continued)

(56) References Cited

U.S. PATENT DOCUMENTS

2016/0153063 A1 6/2016 Goto et al.
2016/0222480 A1 8/2016 Hamatani et al.
(Continued)

FOREIGN PATENT DOCUMENTS

CN 103249854 A 8/2013
CN 104350168 A 2/2015
(Continued)

OTHER PUBLICATIONS

Taiwanese Office Action with Search Report for Taiwanese Application No. 109135099, dated May 14, 2021, 4 pages.
(Continued)

*Primary Examiner* — Nicholas A Wang
(74) *Attorney, Agent, or Firm* — Buchanan Ingersoll & Rooney PC

(57) ABSTRACT

An electric resistance welded steel pipe includes a base metal zone and an electric resistance welded zone. The base metal zone has a predetermined chemical composition and a microstructure including, by volume, ferrite: more than 30%, and bainite: 10% or more. The total volume fraction of the ferrite and the bainite is 70% or more and 95% or less. The balance being one or two or more phases selected from pearlite, martensite, and austenite. Further, when regions surrounded by boundaries between adjacent crystals having a misorientation of 15° or more are defined as crystal grains, the average size of the crystal grains is less than 7.0 μm, and the volume fraction of crystal grains having a size of 40.0 μm or more is 30% or less. A compressive residual stress
(Continued)

generated in the inner and outer surfaces of the steel pipe in the axial direction is 250 MPa or less.

24 Claims, 1 Drawing Sheet

(51) Int. Cl.

| | |
|---|---|
| ***C21D 8/1216*** | (2026.01) |
| ***C21D 9/08*** | (2006.01) |
| ***C22C 38/02*** | (2006.01) |
| ***C22C 38/04*** | (2006.01) |
| ***C22C 38/06*** | (2006.01) |
| ***F16L 9/17*** | (2006.01) |

(52) U.S. Cl.

CPC ........... *C21D 8/1233* (2013.01); *C21D 9/085* (2013.01); *C22C 38/02* (2013.01); *C22C 38/04* (2013.01); *C22C 38/06* (2013.01); *C21D 2211/002* (2013.01); *C21D 2211/005* (2013.01)

(58) Field of Classification Search

CPC ........ C21D 9/08; C21D 8/0236; C21D 6/005; C21D 9/50; C21D 1/02; C21D 7/10; C21D 8/0205; C21D 8/1222; C21D 8/1233; C21D 9/085; C21D 9/46; C22C 38/02; C22C 38/04; C22C 38/06; C22C 38/12; C22C 38/001; C22C 38/14; C22C 38/42; C22C 38/44; C22C 38/58; C22C 38/002; C22C 38/08; C22C 38/16; C22C 38/22; C22C 38/38; C22C 38/18; C22C 38/20; C22C 38/24; C22C 38/26; C22C 38/28; C22C 38/32; C22C 38/34; C22C 38/40; C22C 38/46; C22C 38/48; C22C 38/50; C22C 38/54; C22C 38/60; B21C 37/08

See application file for complete search history.

(56) References Cited

U.S. PATENT DOCUMENTS

| | | | | |
|---|---|---|---|---|
| 2016/0230241 | A1 | 8/2016 | Fukushi et al. | |
| 2017/0369962 | A1 | 12/2017 | Goto et al. | |
| 2019/0211430 | A1 * | 7/2019 | Goto | C22C 38/24 |

FOREIGN PATENT DOCUMENTS

| | | | |
|---|---|---|---|
| CN | 107406940 | A | 11/2017 |
| CN | 108495945 | A | 9/2018 |
| CN | 108728732 | A | 11/2018 |
| EP | 2752499 | A1 | 7/2014 |
| EP | 2902519 | A1 | 8/2015 |
| EP | 3246427 | A1 | 11/2017 |
| EP | 3409803 | A1 | 12/2018 |
| JP | 07102321 | A | 4/1995 |
| JP | 2007254797 | A | 10/2007 |
| JP | 2008184686 | A | 8/2008 |
| JP | 4510515 | * | 5/2010 |
| JP | 2011246971 | * | 12/2011 |
| JP | 2011246971 | A | 12/2011 |
| JP | 5293903 | B1 | 9/2013 |
| JP | WO2017221690 | * | 12/2017 |
| JP | 6260757 | B1 | 1/2018 |
| JP | WO2018235244 | * | 12/2018 |
| JP | 6690788 | B1 | 4/2020 |
| WO | 2015092916 | A1 | 6/2015 |
| WO | 2015098556 | A1 | 7/2015 |
| WO | 2018235244 | A1 | 12/2018 |

OTHER PUBLICATIONS

Extended European Search Report for European Application No. 20880438.5, dated Apr. 14, 2023, 8 pages.
Chinese Office Action with Search Report for Chinese Application No. 202080074629.4, dated Sep. 23, 2022, 9 pages.
Canadian Office Action for Canadian Application No. 3,159,223, dated Oct. 18, 2023, 3 pages.
International Search Report and Written Opinion for International Application No. PCT/JP2020/037650, dated Dec. 1, 2020, 6 pages.

* cited by examiner

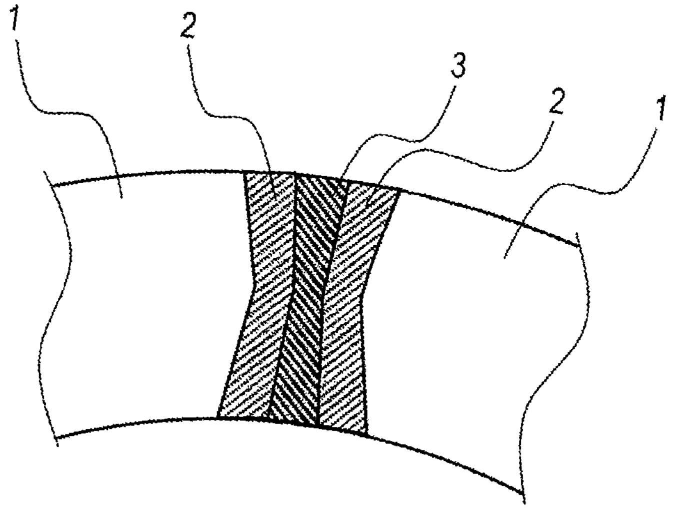
1
2
3
2
1

ELECTRIC RESISTANCE WELDED STEEL PIPE, METHOD FOR PRODUCING THE SAME, LINE PIPE, AND BUILDING STRUCTURE

CROSS REFERENCE TO RELATED APPLICATIONS

This is the U.S. National Phase application of PCT/JP2020/037650, filed Oct. 2, 2020 which claims priority to Japanese Patent Application No. 2019-198508, filed Oct. 31, 2019, the disclosures of these applications being incorporated herein by reference in their entireties for all purposes.

FIELD OF THE INVENTION

The present invention relates to an electric resistance welded steel pipe that can be suitably used for constructing line pipes, building structures, and the like, a method for producing the electric resistance welded steel pipe, a line pipe, and a building structure.

BACKGROUND OF THE INVENTION

An electric resistance welded steel pipe is produced by forming a hot rolled steel sheet (steel strip) coiled in a spiral form into a hollow-cylindrical open pipe by cold roll forming, while feeding the hot rolled steel sheet in a continuous manner; subsequently performing electric resistance welding, in which both edges of the open pipe which abut to each other in the circumferential direction of the pipe are melted by high-frequency electric resistance heating and pressure-welded to each other by upset with squeeze rollers; and then reducing diameter to a predetermined outside diameter with sizing rollers.

Since electric resistance welded steel pipes can be manufactured by cold working in a continuous manner, they are advantageous in terms of, for example, high productivity and high form accuracy. However, since work hardening occurs in the pipe-making process, electric resistance welded steel pipes are likely to have a higher yield ratio in the longitudinal direction than the hot rolled steel sheets, which are materials for the electric resistance welded steel pipes. This results in low deformability of the electric resistance welded steel pipes in bending deformation of the pipes.

The larger the wall thickness of an electric resistance welded steel pipe, the higher the degree of work hardening of the electric resistance welded steel pipe which occurs in the pipe-making process. Therefore, the yield ratio of a thick-walled electric resistance welded steel pipe increases after the pipe-making and deformability becomes degraded.

For the above reasons, it has been difficult to apply thick-walled electric resistance welded steel pipes to large structures, such as line pipes and building columns, which are required to have certain buckling resistance in consideration of earthquake resistance and the like.

For example, Patent Literature 1 proposes a thick-walled electric resistance welded steel pipe that includes polygonal ferrite: 50% to 92% by area, the polygonal ferrite having an average grain size of 15 μm or less, wherein the electric resistance welded zone thereof has a hardness of Hv 160 to Hv 240, and wherein the microstructure of the electric resistance welded zone includes bainite, fine-grained ferrite, and pearlite or includes fine-grained ferrite and bainite.

Patent Literature 2 proposes an as-rolled electric resistance welded steel pipe for line pipes wherein, in the microstructure of the base metal zone at the thickness center, the fraction of polygonal ferrite is 60% to 90%, the average crystal grain size is 15 μm or less, and the proportion of coarse crystal grains, which is the area fraction of crystal grains having a size of 20 μm or more, is 20% or less, and wherein the yield ratio of the steel pipe in the axial direction is 80% to 95%.

PATENT LITERATURE

PTL 1: Japanese Patent No. 5293903
PTL 2: Japanese Patent No. 6260757

SUMMARY OF THE INVENTION

In particular, in the case where the hot rolled steel sheets described in Patent Literatures 1 and 2 are used as a material for thick-walled electric resistance welded steel pipes having a wall thickness of more than 17 mm, the yield ratio of the resulting steel pipes is increased to an excessive degree. Therefore, it is not possible to use the above hot rolled steel sheets as a material for thick-walled electric resistance welded steel pipes applied to large structures.

Aspects of the present invention were made in light of the above-described circumstances. An object of aspects of the present invention is to provide an electric resistance welded steel pipe having a high strength, excellent toughness, and excellent buckling resistance which can be suitably used for constructing large structures, such as line pipes and building columns, a method for producing the electric resistance welded steel pipe, a line pipe, and a building structure.

Note that the expression "high strength" used herein means that the yield stress of the steel pipe is 380 MPa or more. The expression "excellent toughness" used herein means that the Charpy absorbed energy of the steel pipe which is measured at −40° C. is 70 J or more. The expression "excellent buckling resistance" used herein means that the buckling start strain εc (%) of the steel pipe which is measured by an axial compression test satisfies Formula (1) below.

$$\varepsilon c \geq 35 \times t/D \qquad (1)$$

In Formula (1), εc represents the strain (%) at which the compressive load applied in the axial compression test reaches its peak; D represents outside diameter (mm); and t represents wall thickness (mm).

The inventors of the present invention conducted extensive studies and consequently found that, for achieving the intended buckling resistance, it is necessary to limit the yield ratio (=Yield stress/Tensile strength×100) of the electric resistance welded steel pipe in the axial direction to 90% or less and limit the compressive residual stress generated in the inner and outer surfaces of the steel pipe in the axial direction to 250 MPa or less. In other words, lowering the yield ratio to enhance deformability and reducing the compressive residual stress, which promotes compressive deformation, enhances buckling resistance.

The inventors of the present invention conducted further extensive studies and consequently found that, for achieving the intended yield ratio, it is necessary that the steel microstructure be a mixed microstructure of ferrite and bainite and the balance microstructure is one or two or more hard phases selected from pearlite, martensite, and austenite.

It was also found that, in such a steel microstructure, bainite grains are likely to partially become coarsened excessively, which significantly degrades toughness. Therefore, in an electric resistance welded steel pipe having the above-described steel microstructure, it is also necessary to reduce the proportion of coarse crystal grains in addition to limiting the average crystal grain size for achieving the intended toughness.

Aspects of the present invention were made on the basis of the above-described findings. The summary of aspects of the present invention is as follows.

[1] An electric resistance welded steel pipe which includes a base metal zone and an electric resistance welded zone, in which the base metal zone includes:

a chemical composition containing, by mass,

C: 0.040% or more and 0.50% or less,

Si: 0.02% or more and 2.0% or less,

Mn: 0.40% or more and 3.0% or less,

P: 0.10% or less,

S: 0.050% or less,

Al: 0.005% or more and 0.10% or less, and

N: 0.010% or less, with the balance being Fe and incidental impurities; and a steel microstructure which has:

by volume, ferrite: more than 30%, and bainite: 10% or more, a total volume fraction of the ferrite and the bainite being 70% or more and 95% or less, with the balance being one or two or more phases selected from pearlite, martensite, and austenite; and when regions surrounded by boundaries between adjacent crystals having a misorientation of 15° or more are defined as crystal grains, an average size of the crystal grains is less than 7.0 μm, and a volume fraction of crystal grains having a size of 40.0 μm or more is 30% or less;

in which a compressive residual stress generated in inner and outer surfaces of the electric resistance welded steel pipe in an axial direction of the electric resistance welded steel pipe is 250 MPa or less.

[2] The electric resistance welded steel pipe described in [1], in which the chemical composition further contains one or two or more elements selected from, by mass, Nb: 0.15% or less, V: 0.15% or less, Ti: 0.15% or less, Cu: 1.0% or less, Ni: 1.0% or less, Cr: 1.0% or less, Mo: 1.0% or less, Ca: 0.010% or less, and B: 0.0050% or less.

[3] The electric resistance welded steel pipe described in [1] or [2], which has a wall thickness of more than 17 mm and 30 mm or less.

[4] The electric resistance welded steel pipe described in any one of [1] to [3], which has an axial compression property satisfying Formula (1) below.

$$\varepsilon c \geq 35 \times t/D \quad (1)$$

in which, in Formula (1), εc represents a strain (%) at which a compressive load applied in an axial compression test reaches a peak; D represents an outside diameter (mm), and t represents a wall thickness (mm).

[5] A method for producing an electric resistance welded steel pipe, in which the method includes:

forming a hot rolled steel sheet having the chemical composition described in [1] or [2] into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

[6] A method for producing an electric resistance welded steel pipe, in which the method includes:

heating a steel material having the chemical composition described in [1] or [2] to a heating temperature of 1100° C. or more and 1300° C. or less;

hot rolling the steel material at a rough rolling delivery temperature of 850° C. or more and 1150° C. or less and a finish rolling delivery temperature of 750° C. or more and 850° C. or less, such that a total rolling reduction ratio at 930° C. or less is 65% or more;

then performing cooling at an average cooling rate of 10° C./s or more and 30° C./s or less and a cooling stop temperature of 450° C. or more and 650° C. or less, in terms of a temperature of the center of a steel sheet in a thickness direction of the steel sheet;

subsequently performing coiling at a coiling temperature of 450° C. or more and 650° C. or less to prepare a hot rolled steel sheet;

forming the hot rolled steel sheet into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

[7] A line pipe which includes the electric resistance welded steel pipe described in any one of [1] to [4].

[8] A building structure which includes the electric resistance welded steel pipe described in any one of [1] to [4].

According to aspects of the present invention, an electric resistance welded steel pipe having a high strength, excellent toughness, and excellent buckling resistance can be produced. The electric resistance welded steel pipe according to aspects of the present invention can be suitably used for constructing line pipes and building structures.

BRIEF DESCRIPTION OF THE DRAWINGS

The FIGURE is a schematic cross-sectional view of an electric resistance welded zone of an electric resistance welded steel pipe, which is taken in the circumferential direction of the pipe.

DETAILED DESCRIPTION OF EMBODIMENTS OF THE INVENTION

The electric resistance welded steel pipe according to aspects of the present invention and a method for producing the electric resistance welded steel pipe are described below.

The reasons for which the chemical composition of the base metal zone of the electric resistance welded steel pipe is limited in accordance with aspects of the present invention are described below. Note that, hereinafter, the symbol "%" used for describing the chemical composition of steel refers to "% by mass" unless otherwise specified.

C: 0.040% or More and 0.50% or Less

C is an element that increases the strength of steel by solid solution strengthening. C is also an element that contributes to the formation of hard phases by facilitating the formation of pearlite, enhancing hardenability to contribute to the formation of martensite, and contributing to stabilization of austenite. The C content needs to be 0.040% or more in order to achieve the intended strength and yield ratio. However, if the C content exceeds 0.50%, the proportion of hard phases is increased and toughness becomes degraded accordingly. In addition, weldability becomes degraded. Accordingly, the C content is limited to 0.040% or more and 0.50% or less. The C content is preferably 0.060% or more and 0.40% or less and is more preferably more than 0.12% and 0.25% or less.

Si: 0.02% or More and 2.0% or Less

Si is an element that increases the strength of steel by solid solution strengthening. The Si content needs to be 0.02% or more in order to produce the advantageous effect. However, if the Si content exceeds 2.0%, oxides are likely to be formed in the electric resistance welded zone and, consequently, the properties of the weld zone become degraded. Furthermore, the yield ratio of a portion of the steel pipe which is other than the electric resistance welded zone, that is, the base metal zone, is increased and, consequently, toughness becomes degraded. Accordingly, the Si content is limited to 2.0% or less. The Si content is preferably 0.03% or more and 1.0% or less and is more preferably 0.05% or more and 0.50% or less. The Si content is further preferably 0.10% or more and 0.5% or less.

Mn: 0.40% or More and 3.0% or Less

Mn is an element that increases the strength of steel by solid solution strengthening. Mn is also an element that lowers the ferrite transformation start temperature and thereby contributes to refining of microstructure. The Mn content needs to be 0.40% or more in order to achieve the strength and microstructure intended in accordance with aspects of the present invention. However, if the Mn content exceeds 3.0%, oxides are likely to form in the electric resistance welded zone and, consequently, the properties of the weld zone become degraded. Furthermore, as a result of solid solution strengthening and refining of microstructure, yield stress is increased. This makes it impossible to achieve the intended yield ratio. Accordingly, the Mn content is limited to 0.40% or more and 3.0% or less. The Mn content is preferably 0.50% or more and 2.5% or less and is more preferably 0.60% or more and 2.0% or less.

P: 0.10% or Less

Since P segregates at grain boundaries and degrades the homogeneity of the steel material, it is preferable to minimize the P content as an incidental impurity. The allowable P content is 0.10% or less. Accordingly, the P content is limited to 0.10% or less. The P content is preferably 0.050% or less and is more preferably 0.030% or less. Although the lower limit for the P content is not set, the P content is preferably 0.002% or more because reducing the P content to an excessively low level significantly increases the refining costs.

S: 0.050% or Less

S is present in the steel generally in the form of MnS. MnS is thinly stretched in the hot rolling step and adversely affects ductility. Therefore, in accordance with aspects of the present invention, it is preferable to minimize the S content. The allowable S content is 0.050% or less. Accordingly, the S content is limited to 0.050% or less. The S content is preferably 0.020% or less and is more preferably 0.010% or less. Although the lower limit for the S content is not set, the S content is preferably 0.0002% or more because reducing the S content to an excessively low level significantly increases the refining costs.

Al: 0.005% or More and 0.10% or Less

Al is an element that serves as a strong deoxidizing agent. In order to produce the above advantageous effect, the Al content needs to be 0.005% or more. However, if the Al content exceeds 0.10%, weldability becomes degraded. Furthermore, the amount of alumina inclusions is increased. This degrades surface quality. In addition, the toughness of the weld zone becomes degraded. Accordingly, the Al content is limited to 0.005% or more and 0.10% or less. The Al content is preferably 0.010% or more and 0.080% or less and is more preferably 0.015% or more and 0.070% or less.

N: 0.010% or Less

N is an element that firmly anchors the movement of dislocations and thereby degrades toughness. In accordance with aspects of the present invention, it is desirable to minimize the N content. The maximum allowable N content is 0.010%. Accordingly, the N content is limited to 0.010% or less. The N content is preferably 0.0080% or less.

The balance is Fe and incidental impurities. The incidental impurities may include O: 0.0050% or less.

The above-described elements are the fundamental constituents of the chemical composition of the electric resistance welded steel pipe according to aspects of the present invention. The chemical composition may contain one or two or more elements selected from the following elements as needed.

Nb: 0.15% or Less

If the Nb content exceeds 0.15%, the yield ratio is increased and toughness becomes degraded. Therefore, in the case where the steel pipe includes Nb, the Nb content is preferably 0.15% or less. Nb forms fine carbides and nitrides in steel and thereby increases the strength of the steel. Nb is also an element that reduces the likelihood of austenite grains coarsening during hot rolling and thereby contributes to refining of microstructure. In order to produce the above advantageous effects, in the case where the steel pipe includes Nb, the Nb content is preferably 0.002% or more, is more preferably 0.005% or more and 0.13% or less, and is further preferably 0.010% or more and 0.10% or less.

V: 0.15% or Less

If the V content exceeds 0.15%, the yield ratio is increased and toughness becomes degraded. Therefore, in the case where the steel pipe includes V, the V content is preferably 0.15% or less. V is an element that forms fine carbides and nitrides in steel and thereby increases the strength of the steel. The steel pipe may include V as needed. In order to produce the above advantageous effects, in the case where the steel pipe includes V, the V content is preferably 0.002% or more, is more preferably 0.005% or more and 0.13% or less, and is further preferably 0.010% or more and 0.10% or less.

Ti: 0.15% or Less

If the Ti content exceeds 0.15%, the yield ratio is increased and toughness becomes degraded. Therefore, in the case where the steel pipe includes Ti, the Ti content is preferably 0.15% or less. Ti is an element that forms fine carbides and nitrides in steel and thereby increases the strength of the steel. Ti is also an element that has a high affinity for N and therefore reduces the content of solute N in steel. The steel pipe may include Ti as needed. In order to produce the above advantageous effects, in the case where the steel pipe includes Ti, the Ti content is preferably 0.002% or more, is more preferably 0.005% or more and 0.13% or less, and is further preferably 0.010% or more and 0.10% or less.

Cu: 1.0% or Less and Ni: 1.0% or Less

Cu and Ni may reduce toughness and degrade weldability. Therefore, in the case where the steel pipe includes Cu and Ni, the Cu and Ni contents are preferably Cu: 1.0% or less and Ni: 1.0% or less. Cu and Ni are also elements that increase the strength of steel by solid solution strengthening. In order to produce the above advantageous effect, in the case where the steel pipe includes Cu and Ni, the Cu and Ni contents are preferably Cu: 0.01% or more and Ni: 0.01% or more, are more preferably Cu: 0.05% or more and 0.70% or less and Ni: 0.10% or more and Ni: 0.70% or less, and are further preferably Cu: 0.10% or more and 0.50% or less and Ni: 0.10% or more and 0.50% or less.

Cr: 1.0% or Less and Mo: 1.0% or Less

Cr and Mo may reduce toughness and degrade weldability. Therefore, in the case where the steel pipe includes Cr and Mo, the Cr and Mo contents are preferably Cr: 1.0% or less and Mo: 1.0% or less. Cr and Mo are also elements that enhance the hardenability of steel and increase the strength of the steel. The steel pipe may include Cr and Mo as needed. In order to produce the above advantageous effects, in the case where the steel pipe includes Cr and Mo, the Cr and Mo contents are preferably Cr: 0.01% or more and Mo: 0.01% or more, are more preferably Cr: 0.05% or more and 0.70% or less and Mo: 0.05% or more and 0.70% or less, and are further preferably Cr: 0.10% or more and 0.50% or less and Mo: 0.10% or more and 0.50% or less.

Ca: 0.010% or Less

If the Ca content exceeds 0.010%, Ca oxide clusters are formed in steel and, consequently, toughness becomes degraded. Therefore, in the case where the steel pipe includes Ca, the Ca content is preferably 0.010% or less. Ca is also an element that enhances the toughness of the steel by increasing the sphericity of sulfide grains, such as MnS, which are thinly stretched in the hot rolling step and may be added to the steel pipe as needed. In the case where the steel pipe includes Ca, the Ca content is preferably 0.0005% or more in order to produce the above advantageous effect. The Ca content is more preferably 0.0008% or more and 0.008% or less and is further preferably 0.0010% or more and 0.0060% or less.

B: 0.0050% or Less

If the B content exceeds 0.0050%, the yield ratio is increased and toughness becomes degraded. Therefore, in the case where the steel pipe includes B, the B content is preferably 0.0050% or less. B is an element that contributes to refining of microstructure by lowering the ferrite transformation start temperature and may be added to the steel pipe as needed. In the case where the steel pipe includes B, the B content is preferably 0.0003% or more in order to produce the above advantageous effects. The B content is more preferably 0.0005% or more and 0.0030% or less and is further preferably 0.0008% or more and 0.0020% or less.

The reasons for the limitations on the microstructure of the electric resistance welded steel pipe according to aspects of the present invention are described below.

The volume fractions of ferrite and bainite included in the steel microstructure of the electric resistance welded steel pipe according to aspects of the present invention to the entire steel microstructure are ferrite: more than 30% and bainite: 10% or more. The total volume fraction of ferrite and bainite is 70% or more and 95% or less. The balance is one or two or more phases selected from pearlite, martensite, and austenite. When regions surrounded by boundaries between adjacent crystals having a misorientation of 15° or more are defined as crystal grains, the average size (average equivalent circle diameter) of the crystal grains is less than 7.0 μm, and the volume fraction of crystal grains having a size (equivalent circle diameter) of 40.0 μm or more to the entire steel microstructure is 30% or less.

The term "crystal grain size (equivalent circle diameter)" used herein refers to the diameter of a circle having the same area as the crystal grain that is to be measured. The term "steel microstructure" used herein refers to the microstructure of a portion of the steel pipe which is other than the electric resistance welded zone, that is, the base metal zone, which is measured at the wall-thickness center.

Ferrite Volume Fraction: More than 30%, Bainite Volume Fraction: 10% or More, and Total Volume Fraction of Ferrite and Bainite: 70% or More and 95% or Less Since ferrite is a soft microstructure, mixing ferrite with a hard microstructure reduces the yield ratio of steel. In order to achieve the yield ratio intended in accordance with aspects of the present invention by the above advantageous effect, the volume fraction of ferrite needs to be more than 30% and is preferably 40% or more. In order to achieve the intended yield stress, the volume fraction of ferrite is preferably less than 70% and is more preferably 60% or less.

Bainite is a microstructure having an intermediate hardness and increases the strength of steel. The volume fraction of bainite needs to be 10% or more, because the intended yield stress and tensile strength are not achieved by only ferrite. The volume fraction of bainite is preferably 15% or more. In order to achieve the intended yield ratio, the volume fraction of bainite is preferably less than 40% and is more preferably 35% or less.

If the total volume fraction of ferrite and bainite is less than 70%, the yield ratio or toughness intended in accordance with aspects of the present invention fails to be achieved. If the total volume fraction of ferrite and bainite exceeds 95%, the yield stress and yield ratio intended in accordance with aspects of the present invention fail to be achieved. Therefore, it is necessary to limit the total volume fraction of ferrite and bainite to 70% or more and 95% or less in addition to the volume fractions of ferrite and bainite above. The total volume fraction of ferrite and bainite is preferably 75% or more and 93% or less.

Balance: One or Two or More Phases Selected from Pearlite, Martensite, and Austenite Since pearlite, martensite, and austenite are hard microstructures, they particularly increase the tensile strength of steel. Moreover, mixing pearlite, martensite, and austenite with soft ferrite reduces the yield ratio of steel. In order to produce the above advantageous effects, the total of the volume fractions of pearlite, martensite, and austenite is preferably 5% or more and 30% or less and is more preferably 7% or more and 25% or less. The balance microstructure may be a microstructure of one or two or more phases selected from pearlite, martensite, and austenite.

The volume fractions of ferrite, bainite, pearlite, martensite, and austenite can be measured by the method described in Examples below.

When Regions Surrounded by Boundaries Between Adjacent Crystals Having Misorientation (Crystallographic Misorientation) of 15° or More are Defined as Crystal Grains, Average Crystal Grain Size: Less than 7.0 μm, and Volume Fraction of Crystal Grains Having Size of 40.0 μm or More: 30% or Less As described above, the steel microstructure according to aspects of the present invention is a steel including soft and hard phases in a mixed manner (hereinafter, this steel is referred to as "multi-phase steel") in order to achieve the low yield ratio and yield stress intended in accordance with aspects of the present invention. However, a multi-phase steel has lower toughness than a single-phase steel. Accordingly, in accordance with aspects of the present invention, the upper limit for the average size of crystal grains that are defined as regions surrounded by boundaries between adjacent crystals having a crystallographic misorientation of 15° or more is set in order to achieve both the above-described mechanical properties and excellent toughness. If the average size of the crystal grains is 7.0 μm or more, ferrite grains are not refined to a sufficient degree and, consequently, the intended yield stress and toughness fail to be achieved. The average size of the crystal grains is preferably less than 6.0 μm. A reduction in the average crystal grain size increases the yield ratio. Therefore, in order to achieve the low yield ratio, the average crystal grain size is preferably 2.0 μm or more and is more preferably 4.0 μm or more.

In general, the crystal grain size distribution of a single-phase steel or a steel analogous to a single-phase steel is a log-normal distribution that has one peak and becomes widened and narrowed in the direction in which the variable increases and decreases, respectively. However, it was found that the crystal grain size distribution of a multi-phase steel including ferrite and bainite as in accordance with aspects of the present invention has another peak derived from bainite on a coarse-grain side.

Specifically, the crystal grain size distribution of the steel microstructure according to aspects of the present invention, that is, a multi-phase steel in which the volume fraction of ferrite is more than 30% and the volume fraction of bainite is 10% or more, has another peak derived from bainite on a coarse-grain side. This indicates that coarse bainite grains are present in a mixed manner. The presence of the coarse bainite grains leads to significant degradation of toughness. Consequently, setting an upper limit to the maximum crystal grain size of the multi-phase steel does not limit the proportion of the coarse bainite grains to a low degree. Therefore, for achieving suitable toughness, it is also necessary to set an upper limit to the proportion of coarse crystal grains.

Bainite does not grow beyond the boundaries of crystal grains having a large misorientation (austenite grain boundaries and sub-boundaries formed as a result of accumulation of dislocations). Therefore, for suppressing the formation of the coarse bainite grains, it is particularly effective to minimize the temperature at which finish rolling is performed in the hot rolling step, introduce a large amount of dislocations to austenite in order to increase the area of sub-boundaries, and thereby form fine subgrain structure (hereinafter, this process is referred to also as "refining").

The toughness of the steel pipe according to aspects of the present invention can be enhanced by increasing the total area of the grain boundaries which serve as a resistance to brittle fracture. In accordance with aspects of the present invention, it was newly found as a result of pilot studies that it becomes impossible to maintain the certain area of grain boundaries sufficient for achieving the required toughness if the volume fraction of coarse crystal grains having a size of 40.0 μm or more exceeds 30%. Accordingly, in accordance with aspects of the present invention, the above average crystal grain size is limited to less than 7.0 μm and the volume fraction of crystal grains having a size of 40.0 μm or more is limited to 30% or less. The volume fraction of crystal grains having a size of 40.0 μm or more is preferably 20% or less.

The above crystallographic misorientation, the above average crystal grain size, and the volume fraction of crystal grains having a size of 40.0 μm or more can be measured by a SEM/EBSD method. In this embodiment, the method described in Examples below can be used.

In accordance with aspects of the present invention, the above-described advantageous effects can be produced even in the case where the above steel microstructure is present in the ranges ±1.0 mm from the wall-thickness center in the wall-thickness direction. Therefore, the expression "steel microstructure at wall-thickness center" used herein means that the above-described steel microstructure is present in either of the ranges ±1.0 mm from the wall-thickness center in the wall-thickness direction.

The reasons for the limitations on the compressive residual stress of the electric resistance welded steel pipe according to aspects of the present invention are described below.

The compressive residual stress generated in the inner and outer surfaces of the electric resistance welded steel pipe according to aspects of the present invention in the axial direction is 250 MPa or less. If the compressive residual stress of the steel pipe exceeds 250 MPa, the stiffness of the steel pipe against compressive deformation in the axial direction or the compressive deformation of an inner portion of a bend during bending deformation becomes degraded and, consequently, buckling may occur easily. Accordingly, the compressive residual stress generated in the inner and outer surfaces of the steel pipe in the axial direction is limited to 250 MPa or less and is more preferably 200 MPa or less.

The axial compression property of the electric resistance welded steel pipe according to aspects of the present invention preferably satisfies Formula (1) below.

$$\varepsilon c \geq 35 \times t/D \quad (1)$$

where, in Formula (1), εc represents the strain (%) at which a compressive load applied in the axial compression test reaches its peak; D represents outside diameter (mm), and t represents wall thickness (mm).

A method for producing the electric resistance welded steel pipe according to an embodiment of the present invention is described below.

The electric resistance welded steel pipe according to aspects of the present invention can be produced by, for example, forming a hot rolled steel sheet having the above-described chemical composition into a hollow-cylindrical shape by cold roll forming, subsequently performing electric resistance welding to prepare an electric resistance welded steel pipe, and reducing the diameter of the electric resistance welded steel pipe such that the circumference of the steel pipe reduces by 0.30% or more and 2.0% or less. Alternatively, the electric resistance welded steel pipe according to aspects of the present invention can be produced by, for example, heating a steel material having the above-described chemical composition to a heating temperature of 1100° C. or more and 1300° C. or less, hot rolling the steel material at a rough rolling delivery temperature of 850° C. or more and 1150° C. or less and a finish rolling delivery temperature of 750° C. or more and 850° C. or less, such that the total rolling reduction ratio at 930° C. or less is 65% or more, then performing cooling at an average cooling rate of 10° C./s or more and 30° C./s or less and a cooling stop temperature of 450° C. or more and 650° C. or less, in terms of a temperature of the center of the steel sheet in the thickness direction, subsequently performing coiling at a coiling temperature of 450° C. or more and 650° C. or less to prepare a hot rolled steel sheet, forming the hot rolled steel sheet into a hollow-cylindrical shape by cold roll forming, subsequently performing electric resistance welding to prepare an electric resistance welded steel pipe, and reducing the diameter of the electric resistance welded steel pipe such that the circumference of the steel pipe reduces by 0.30% or more and 2.0% or less.

In the description of the manufacturing method below, when referring to temperature, the symbol "° C." refers to the surface temperature of the steel material or steel sheet (hot rolled steel sheet) unless otherwise specified. These surface temperatures can be measured with a radiation thermometer or the like. The temperature of the center of the steel sheet in the thickness direction can be determined by calculating the temperature distribution in a cross section of the steel sheet by heat-transfer analysis and correcting the results on the basis of the surface temperature of the steel sheet. The term "hot rolled steel sheet" used herein refers to not only hot rolled steel sheet but also hot rolled steel strip.

In accordance with aspects of the present invention, a method for preparing a molten steel material (steel slab) is not limited and any of known molten steel-preparing methods using a converter, an electric furnace, a vacuum melting furnace, or the like may be used. The casting method is not limited too. A cast slab having intended dimensions can be produced by a known casting method, such as continuous casting. Note that an ingot casting-slabbing process may be used instead of continuous casting with no problem. The molten steel may be further subjected to secondary refining, such as ladle refining.

The resulting steel material (steel slab) is subjected to hot rolling, in which the steel material is heated to a heating temperature of 1100° C. or more and 1300° C. or less, then rough rolled at a rough rolling delivery temperature of 850° C. or more and 1150° C. or less, and subsequently finish rolled at a finish rolling delivery temperature of 750° C. or more and 850° C. or less, such that the total rolling reduction ratio at 930° C. or less is 65% or more, to form a hot rolled steel sheet.

Heating Temperature: 1100° C. or More and 1300° C. or Less

If the heating temperature is less than 1100° C., the deformation resistance of the steel that is to be rolled is increased and, consequently, it becomes difficult to perform rolling. On the other hand, if the heating temperature exceeds 1300° C., austenite grains become coarsened and fine austenite grains fail to be formed in the subsequent rolling step (rough rolling and finish rolling). In such a case, it becomes difficult to achieve the average crystal grain size of the steel microstructure of the electric resistance welded steel pipe according to aspects of the present invention. Furthermore, it becomes difficult to suppress the formation of coarse bainite grains. This makes it difficult to control the volume fraction of crystal grains having a size of 40.0 μm or more to fall within the range according to aspects of the present invention. Accordingly, the heating temperature in the hot rolling step is limited to 1100° C. or more and 1300° C. or less and is preferably 1120° C. or more and 1280° C. or less.

In accordance with aspects of the present invention, in addition to a conventional method in which, subsequent to the production of a steel slab (slab), the slab is temporarily cooled to room temperature and then reheated, energy-saving hot-charge rolling processes in which a hot slab is directly charged into a heating furnace without being cooled to room temperature or in which heat insulation is performed for a short period of time and hot rolling is then performed immediately may also be used with no problem.

Rough Rolling Delivery Temperature: 850° C. or More and 1150° C. or Less

If the rough rolling delivery temperature is less than 850° C., the surface temperature of the steel sheet may be reduced to a temperature equal to or less than the ferrite transformation start temperature in the subsequent finish rolling step. In such a case, a large amount of deformed ferrite is formed, which increases the yield ratio. On the other hand, if the rough rolling delivery temperature exceeds 1150° C., a sufficient amount of rolling reduction fails to be done within the austenite non-recrystallization temperature range. This makes it impossible to form fine austenite grains and, consequently, it becomes difficult to achieve the average crystal grain size of the steel microstructure of the electric resistance welded steel pipe which is intended in accordance with aspects of the present invention. In addition, it becomes difficult to suppress the formation of coarse bainite grains. Accordingly, the rough rolling delivery temperature is limited to 850° C. or more and 1150° C. or less and is preferably 860° C. or more and 1000° C. or less.

Finish Rolling Delivery Temperature: 750° C. or More and 850° C. or Less

If the finish rolling delivery temperature is less than 750° C., the surface temperature of the steel sheet may be reduced to a temperature equal to or less than the ferrite transformation start temperature in the subsequent finish rolling step. In such a case, a large amount of deformed ferrite is formed, which increases the yield ratio. On the other hand, if the finish rolling delivery temperature exceeds 850° C., a sufficient amount of rolling reduction fails to be done within the austenite non-recrystallization temperature range. This makes it impossible to form fine austenite grains and, consequently, it becomes difficult to achieve the average crystal grain size of the steel microstructure of the electric resistance welded steel pipe in accordance with aspects of the present invention. In addition, it becomes difficult to suppress the formation of coarse bainite grains. Accordingly, the finish rolling delivery temperature is limited to 750° C. or more and 850° C. or less and is preferably 770° C. or more and 830° C. or less.

Total Rolling Reduction Ratio at 930° C. or Less: 65% or More

In accordance with aspects of the present invention, the subgrains of austenite are refined in the hot rolling step in order to refine ferrite, bainite, and the balance microstructure formed in the subsequent cooling and coiling steps and thereby form the steel microstructure of the electric resistance welded steel pipe having the intended strength and toughness. For refining the subgrains of austenite in the hot rolling step, it is necessary to increase the rolling reduction ratio in the austenite non-recrystallization temperature range and thereby introduce a sufficiently large work strain. In order to achieve this, in accordance with aspects of the present invention, the total rolling reduction ratio at 930° C. or less is limited to 65% or more.

If the total rolling reduction ratio at 930° C. or less is less than 65%, a sufficiently large work strain may fail to be introduced in the hot rolling step. In such a case, a microstructure having the crystal grain size intended in accordance with aspects of the present invention is not formed. The total rolling reduction ratio at 930° C. or less is preferably 70% or more. Although the upper limit for the above total rolling reduction ratio is not set, if the above total rolling reduction ratio is more than 80%, the effectiveness of increasing the rolling reduction ratio to enhance toughness is reduced and only the machine load is increased accordingly. Therefore, the total rolling reduction ratio at 930° C. or less is preferably 80% or less and is more preferably 75% or less.

In accordance with aspects of the present invention, the condition of "930° C. or less" is set because, at a temperature of more than 930° C., recrystallization of austenite occurs in the hot rolling step and the dislocations introduced by rolling may be disappeared. In such a case, fine austenite grains are not formed.

Note that the total rolling reduction ratio is the total of the rolling reduction ratios of rolling passes within a temperature range of 930° C. or less.

When the slab is hot rolled, the hot rolling may be performed such that the total rolling reduction ratio at 930° C. or less is 65% or more by both rough rolling and finish rolling. Alternatively, hot rolling may be performed such that the total rolling reduction ratio at 930° C. or less is 65% or more by only the finish rolling. In the latter case, when it is not possible to achieve a total rolling reduction ratio of 65% or more at 930° C. or less by only the finish rolling, the slab is cooled to 930° C. or less at some midpoint of the rough rolling such that the total rolling reduction ratio at 930° C. or less in both rough rolling and finish rolling is 65% or more.

In accordance with aspects of the present invention, although the upper limit for the final sheet thickness (the thickness of the steel sheet that has been subjected to finish rolling) is not set, the final sheet thickness is preferably more than 17 mm and is 30 mm or less in order to achieve the required rolling reduction ratio and control the temperature of the steel sheet in a suitable manner.

Subsequent to the hot rolling step, the hot rolled steel sheet is subjected to a cooling step. In the cooling step, cooling is performed such that the average cooling rate at which the temperature is lowered to the cooling stop temperature is 10° C./s or more and 30° C./s or less and the cooling stop temperature is 450° C. or more and 650° C. or less.

Average Cooling Rate from when Cooling is Started to when Cooling is Stopped (Cooling is Finished): 10° C./s or More and 30° C./s or Less If the average cooling rate at which cooling is performed from when the cooling is started to when cooling is stopped, which is described below, is less than 10° C./s in terms of the temperature of the center of the hot rolled steel sheet in the thickness direction, the frequency at which ferrite nuclei are formed is reduced and ferrite grains become coarsened. In such a case, it becomes impossible to adjust the average crystal grain size to be less than 7.0 μm. Furthermore, it becomes difficult to control the volume fraction of crystal grains having a size of 40.0 μm or more to fall within the range intended in accordance with aspects of the present invention. On the other hand, if the average cooling rate exceeds 30° C./s, a large amount of martensite is formed and the total volume fraction of ferrite and bainite is reduced to be less than 70%. The average cooling rate is preferably 15° C./s or more and 25° C./s or less.

In accordance with aspects of the present invention, it is preferable to start cooling immediately after the finish rolling has been finished, in order to suppress the formation of ferrite in the surface of the steel sheet that is to be cooled.

Cooling Stop Temperature: 450° C. or More and 650° C. or Less

If the cooling stop temperature at which the cooling is stopped is less than 450° C. in terms of the temperature of the center of the hot rolled steel sheet in the thickness direction, a large amount of martensite is formed and the total volume fraction of ferrite and bainite is reduced to be less than 70%. On the other hand, if the cooling stop temperature is more than 650° C., the frequency at which ferrite nuclei are formed is reduced and ferrite grains become coarsened. In addition, the volume fraction of bainite fails to be 10% or more because the cooling stop temperature is higher than the bainite transformation start temperature. The cooling stop temperature is preferably 480° C. or more and 620° C. or less.

Note that, in accordance with aspects of the present invention, the average cooling rate is the value (cooling rate) calculated by ((Temperature of center of hot rolled steel sheet in thickness direction before cooling−Temperature of center of hot rolled steel sheet in thickness direction after cooling)/The amount of time during which cooling is performed) unless otherwise specified. Examples of the cooling method include a water cooling method in which, for example, water is sprayed from a nozzle and a cooling method in which a coolant gas is sprayed. In accordance with aspects of the present invention, it is preferable to subject both surfaces of the hot rolled steel sheet to a cooling operation (treatment) such that both surfaces of the hot rolled steel sheet are cooled under the same conditions.

Subsequent to the cooling step, a coiling step in which the hot rolled steel sheet is coiled at a coiling temperature of 450° C. or more and 650° C. or less and then allowed to be naturally cooled is conducted.

In the coiling step, the hot rolled steel sheet is coiled at a coiling temperature of 450° C. or more and 650° C. or less in consideration of the microstructure of the steel sheet. If the coiling temperature is less than 450° C., a large amount of martensite is formed and the total volume fraction of ferrite and bainite may be reduced to be less than 70%. If the coiling temperature is more than 650° C., the frequency at which ferrite nuclei are formed is reduced and ferrite grains become coarsened. In addition, the volume fraction of bainite may fail to be 10% or more because the coiling temperature is higher than the bainite transformation start temperature. The coiling temperature is preferably 480° C. or more and 620° C. or less.

Subsequent to the coiling step, a pipe-making step is conducted. In the pipe-making step, the hot rolled steel sheet is formed into a hollow-cylindrical open pipe (round steel pipe) by roll forming and electric resistance welding, in which both edges of the open pipe which abut to each other in the circumferential direction of the pipe are melted by high-frequency electric resistance heating and pressure-welded to each other by upset with squeeze rollers, is performed to form an electric resistance welded steel pipe. The electric resistance welded steel pipe is then subjected to a sizing treatment, in which the diameter of the electric resistance welded steel pipe is reduced with rollers arranged to face the upper, lower, left, and right sides of the electric resistance welded steel pipe in order to adjust the outside diameter of the steel pipe to be the intended value.

The amount of upset with which the electric resistance welding is performed is preferably 20% or more of the thickness of the steel sheet in order to enable the inclusions that degrade toughness, such as oxides and nitrides, are discharged together with molten steel. However, if the amount of upset exceeds 100% of the thickness of the steel sheet, the load applied to the squeeze rollers is increased. Accordingly, the amount of upset is preferably 20% or more and 100% or less and is more preferably 40% or more and 80% or less of the thickness of the steel sheet.

In the sizing step conducted subsequent to electric resistance welding, it is necessary to reduce the diameter of the steel pipe such that the circumference of the steel pipe is reduced by 0.30% or more with all stands used in the sizing step, in order to achieve the residual stress of the steel pipe in the axial direction which is intended in accordance with aspects of the present invention. However, if the diameter reduction is performed such that the total reduction of the circumference of the steel pipe is more than 2.0%, the amount of bend in which the steel pipe is bent in the axial direction while being passed through the rollers is increased and, consequently, the residual stress generated in the steel pipe in the axial direction subsequent to the diameter reduction is rather increased disadvantageously. Furthermore, severe work hardening of the steel pipe occurs. This degrades ductility and buckling resistance. Accordingly, the diameter reduction is performed such that the circumference of the steel pipe reduces by 0.30% or more and 2.0% or less. The reduction in the circumference of the steel pipe is preferably 0.50% or more and 1.8% or less.

In the sizing step, it is preferable to perform the diameter reduction in multiple stages with a plurality of stands in order to minimize the amount of bend in which the steel pipe is bent in the axial direction while being passed through the rollers and limit the generation of the residual stress in the axial direction of the steel pipe. It is preferable that the reduction in the circumference of the steel pipe which is achieved with each stand in the diameter reduction step be 1.0% or less.

Whether or not the steel pipe is an electric resistance welded steel pipe can be determined by cutting the electric resistance welded steel pipe in a direction perpendicular to the axial direction of the steel pipe, polishing a cross section of the steel pipe which includes a weld zone (electric resistance welded zone), etching the cross section, and then inspecting the cross section with an optical microscope. The steel pipe is considered as an electric resistance welded steel pipe when the width of a molten and solidified zone of the weld zone (electric resistance welded zone) in the circumferential direction of the steel pipe is 1.0 μm or more and 1000 μm or less all over the entire thickness of the steel pipe.

The etchant used above may be selected appropriately in accordance with the constituents of the steel and the type of the steel pipe. The molten and solidified zone can be visually identified as a region (molten and solidified zone 3) having a microstructure and a contrast different from those of a base metal zone 1 or welded heat affected zone 2, as illustrated in the schematic diagram of the etched cross section of the FIGURE. For example, a molten and solidified zone of an electric resistance welded steel pipe composed of a carbon steel and a low-alloy steel can be identified as a region that appears white in the nital-etched cross section when observed with an optical microscope, and a molten and solidified zone of a UOE steel line pipe composed of a carbon steel and a low-alloy steel can be identified as a region that includes a cell-like or dendrite solidified microstructure in the nital-etched cross section when observed with an optical microscope.

The electric resistance welded steel pipe according to aspects of the present invention is produced by the above-described method. The electric resistance welded steel pipe according to aspects of the present invention has excellent buckling resistance even in the case where, in particular, the wall thickness of the steel pipe is more than 17 mm and 30 mm or less. The electric resistance welded steel pipe according to aspects of the present invention also has a high strength and excellent toughness.

The electric resistance welded steel pipe according to aspects of the present invention can be suitably used for constructing large structures, such as line pipes and columns for civil engineering and building structures, which are required to have certain buckling resistance in consideration of earthquake resistance and the like.

EXAMPLES

Details of aspects of the present invention are further described with reference to Examples below. Note that the present invention is not limited to Examples below.

Molten steels having the chemical compositions described in Table 1 were prepared and formed into slabs. The slabs were subjected to a hot rolling step, a cooling step, and a coiling step under the conditions described in Table 2. Hereby, hot rolled steel sheets for electric resistance welded steel pipes which had the final sheet thicknesses (mm) described in Table 2 were prepared.

Subsequent to the coiling step, each of the hot rolled steel sheets was formed into a hollow-cylindrical round steel pipe by roll forming, and the abutting edges of the steel pipe were joined to each other by electric resistance welding. Subsequently, diameter reduction was performed using the rollers arranged to face the upper, lower, left, and right sides of the round steel pipe. Hereby, electric resistance welded steel pipes having the outside diameters (mm) and wall thicknesses (mm) described in Table 2 were prepared.

An electric resistance welded steel pipe having a length of 1800 mm in the axial direction of the steel pipe was taken from each of the electric resistance welded steel pipes and subjected to the measurement of residual stress in the axial direction of the pipe and an axial compression test.

Test specimens were also taken from each of the electric resistance welded steel pipes and subjected to the microstructure observation, tensile test, and Charpy impact test described below. Various types of test specimens were taken from the base metal zone, which was 90° away from the electric resistance welded zone in the circumferential direction of the pipe.

[Measurement of Residual Stress]

The measurement of residual stress was conducted, by X-ray diffraction, in the planes exposed by electropolishing the inner and outer surfaces of each of the electric resistance welded steel pipes at the longitudinal center of the pipe to a depth of 100 μm. The residual stress was determined in the axial direction of the pipe. The measurement was conducted at the electric resistance welded zone and positions spaced at intervals of 30 degrees with reference to the electric resistance welded zone in the circumferential direction of the pipe, that is, at 24 positions for each electric resistance welded steel pipe. The maximum compressive residual stress was determined on the basis of the results of measurement at the 24 positions.

[Microstructure Observation]

In the microstructure observation, a microstructure present at a depth (¼)t of the wall thickness t below the outer surface of the steel pipe was observed and images of the microstructure were taken with an optical microscope (magnification: 1000 times) or a scanning electron microscope (SEM, magnification: 1000 times). The area fractions of ferrite, pearlite, bainite, and the balance microstructure were determined on the basis of the optical microscope image and the SEM image.

The area fractions of the above microstructure components were each determined by conducting the above observation in five or more fields of view and taking the average of the fractions measured. In Examples, the area fractions of microstructure components determined by microstructure observation were considered as the volume fractions of the microstructure components.

Ferrite is the product of diffusion transformation and appears as a nearly restored microstructure having a low dislocation density. Examples of such ferrite include polygonal ferrite and quasipolygonal ferrite. Bainite is a multiphase microstructure including lath ferrite having a high dislocation density and cementite. Pearlite is an eutectic microstructure (ferrite+cementite) including iron and iron carbide and appears as a lamellar microstructure including linear ferrite and cementite arranged alternately. Martensite is a lath, low-temperature transformation microstructure having a markedly high dislocation density and appears lighter than ferrite or bainite in a SEM image.

In an optical microscope image and a SEM image, it is difficult to distinguish martensite and austenite from each other. Therefore, the volume fraction of martensite was determined by calculating the area fraction of microstructure identified as martensite or austenite in the SEM image and subtracting the volume fraction of austenite measured by the method described below from the above area ratio.

The volume fraction of austenite was measured by X-ray diffraction. A test specimen for microstructure observation was prepared by performing grinding such that a diffraction plane was at a depth (¼)t of the wall thickness t below the outer surface of the steel pipe and removing a surface processing layer by chemical polishing. In the measurement, Mo-Kα radiation was used. The volume fraction of austenite was calculated on the basis of the integral intensities of the (200), (220), and (311) planes of fcc iron and the (200) and (211) planes of bcc iron.

The average crystal grain size (average equivalent circle diameter) and the volume fraction of crystal grains having a size (equivalent circle diameter) of 40.0 μm or more were measured by a SEM/EBSD method. As for crystal grain size, the misorientations between adjacent crystal grains were measured, and the boundaries between crystal grains having a misorientation of 15° or more were considered as crystal grain boundaries. The arithmetic average of the grain sizes was determined on the basis of the crystal grain boundaries and considered as average crystal grain size. The measurement region was 500 μm×500 μm, and the measurement step size was 0.5 μm. In the analysis of crystal grain size, crystal grains having a size of less than 2.0 μm were considered as a measurement noise and excluded from analysis targets. The resulting area fraction was considered equal to the volume fraction.

[Tensile Test]

In the tensile test, a JIS No. 5 tensile test specimen was taken such that the tensile direction of the tensile test specimen was parallel to the longitudinal direction of the pipe. The tensile test was conducted in accordance with the procedures defined in JIS Z 2241. A yield stress YS (MPa) and a tensile strength TS (MPa) were measured. A yield ratio YR (%) defined as (YS/TS)×100 was calculated. Note that the yield stress YS was a flow stress at a nominal strain of 0.5%.

[Charpy Impact Test]

In the Charpy impact test, a V-notch test specimen was taken from each of the electric resistance welded steel pipes at the thickness center of the steel sheet such that the longitudinal direction of the test specimen was parallel to the circumferential direction of the steel pipe (perpendicular to the longitudinal direction of the steel pipe). The test was conducted at −40° C. in accordance with the procedures defined in JIS Z 2242 to measure an absorbed energy. The number of test specimens taken from each steel pipe was three, and the average of the absorbed energies of the three test specimens was used as the absorbed energy of the electric resistance welded steel pipe.

[Axial Compression Test]

A pressure-resistant plate was attached to both ends of the steel pipe, and an axial compression test was conducted using a large compressive testing apparatus. The strain at which the compressive load reached its peak was considered as a buckling start strain εc (%). An evaluation of "Passed" was given when the buckling start strain εc (%) satisfied Formula (1) below.

$$\varepsilon c \geq 35 \times t/D \qquad (1)$$

where, in Formula (1), D represents outside diameter (mm), and t represents wall thickness (mm).

Table 3 lists the results.

TABLE 1

| Steel | Chemical composition (mass %) | | | | | | | | | | | | | | | |
|---|---|---|---|---|---|---|---|---|---|---|---|---|---|---|---|---|
| pipe No. | C | Si | Mn | P | S | Al | N | Nb | Ti | V | Cr | Mo | Cu | Ni | Ca | B | Remark |
| 1 | 0.141 | 0.34 | 1.82 | 0.014 | 0.0073 | 0.051 | 0.0033 | — | — | — | — | — | — | — | — | — | Conforming steel |
| 2 | 0.218 | 0.09 | 1.23 | 0.021 | 0.0008 | 0.037 | 0.0024 | 0.030 | 0.024 | 0.011 | — | — | — | — | — | — | Conforming steel |
| 3 | 0.064 | 0.45 | 0.62 | 0.006 | 0.0014 | 0.022 | 0.0045 | 0.021 | 0.015 | — | 0.34 | 0.28 | — | — | — | — | Conforming steel |
| 4 | 0.507 | 0.12 | 0.77 | 0.012 | 0.0004 | 0.043 | 0.0032 | 0.015 | 0.011 | — | — | — | — | — | — | — | Comparative steel |
| 5 | 0.035 | 0.33 | 1.19 | 0.025 | 0.0080 | 0.018 | 0.0029 | 0.027 | 0.018 | — | — | — | 0.11 | 0.07 | — | — | Comparative steel |
| 6 | 0.162 | 2.13 | 0.98 | 0.018 | 0.0035 | 0.029 | 0.0041 | 0.039 | 0.020 | — | — | — | — | — | — | — | Comparative steel |
| 7 | 0.134 | 0.01 | 1.35 | 0.008 | 0.0005 | 0.044 | 0.0037 | 0.011 | 0.011 | — | — | — | — | — | — | — | Comparative steel |
| 8 | 0.140 | 0.15 | 3.15 | 0.011 | 0.0026 | 0.025 | 0.0026 | 0.020 | 0.022 | — | — | — | — | — | — | — | Comparative steel |
| 9 | 0.186 | 0.09 | 0.37 | 0.009 | 0.0019 | 0.030 | 0.0031 | 0.008 | 0.030 | — | — | — | — | — | — | — | Comparative steel |
| 10 | 0.125 | 0.20 | 0.83 | 0.024 | 0.0011 | 0.026 | 0.0026 | 0.024 | 0.023 | — | — | — | — | — | — | — | Conforming steel |
| 11 | 0.091 | 0.35 | 0.95 | 0.007 | 0.0006 | 0.040 | 0.0040 | 0.016 | 0.024 | — | — | — | — | — | — | — | Conforming steel |
| 12 | 0.173 | 0.14 | 0.82 | 0.005 | 0.0010 | 0.030 | 0.0027 | 0.009 | 0.011 | — | — | — | 0.15 | 0.21 | 0.0013 | 0.0005 | Conforming steel |

Constituents other than the above is the balance of Fe and incidental impurities.

The underlined values are outside the scope of the present invention.

TABLE 2

| Steel pipe No. | Hot rolling step: Heating temperature (° C.) | Rough rolling delivery temperature (° C.) | Finish rolling delivery temperature (° C.) | Total rolling reduction ratio at 930° C. or less (%) | Cooling step: Average cooling rate (° C./s) | Cooling stop temperature (° C.) | Coiling step: Coiling temperature (° C.) | Sizing step: Diameter reduction ratio (%) | Dimensions of steel pipe: Outside diameter D (mm) | Wall thickness t (mm) | Remark |
|---|---|---|---|---|---|---|---|---|---|---|---|
| 1 | 1210 | 880 | 790 | 72 | 17 | 560 | 540 | 0.83 | 406.4 | 23.8 | Invention example |
| 2 | 1180 | 920 | 820 | 74 | 23 | 535 | 520 | 1.15 | 406.4 | 22.2 | Invention example |
| 3 | 1200 | 1010 | 840 | 68 | 24 | 580 | 555 | 0.66 | 508.0 | 25.4 | Invention example |
| 4 | 1200 | 870 | 800 | 71 | 13 | 560 | 550 | 1.53 | 609.6 | 22.2 | Comparative example |
| 5 | 1230 | 960 | 810 | 67 | 15 | 590 | 570 | 0.95 | 400.0 | 19.0 | Comparative example |
| 6 | 1190 | 990 | 820 | 70 | 12 | 550 | 530 | 0.87 | 400.0 | 19.0 | Comparative example |
| 7 | 1250 | 870 | 790 | 74 | 15 | 610 | 595 | 1.32 | 406.4 | 22.2 | Comparative example |
| 8 | 1240 | 900 | 840 | 68 | 16 | 530 | 515 | 1.24 | 406.4 | 22.2 | Comparative example |
| 9 | 1170 | 910 | 770 | 66 | 20 | 560 | 540 | 1.44 | 600.0 | 19.0 | Comparative example |
| 10 | 1240 | 1130 | 830 | 62 | 24 | 600 | 580 | 1.35 | 406.4 | 20.6 | Comparative example |
| 11 | 1280 | 1020 | 840 | 71 | 19 | 540 | 520 | 0.28 | 609.6 | 23.8 | Comparative example |
| 12 | 1220 | 1010 | 820 | 73 | 18 | 510 | 490 | 0.61 | 508.0 | 23.8 | Invention example |

The underlined values are outside the scope of the present invention.

TABLE 3

| Steel pipe No. | Steel microstructure*: Type | Volume fraction (%): F | B | F + B | P | M | A | Crystal grain size distribution: Average crystal grain size (μm) | Volume fraction of grains having size of 40 μm or more (%) | Residual stress in surfaces of steel pipe: Maximum compressive residual stress (MPa) |
|---|---|---|---|---|---|---|---|---|---|---|
| 1 | F + B + P | 58 | 33 | 91 | 9 | 0 | 0 | 5.3 | 15 | 193 |
| 2 | F + B + P | 55 | 26 | 81 | 19 | 0 | 0 | 4.7 | 8 | 176 |
| 3 | F + B + P | 46 | 49 | 95 | 5 | 0 | 0 | 6.1 | 11 | 223 |
| 4 | F + B + P + M + A | 32 | 36 | 68 | 17 | 11 | 4 | 6.2 | 24 | 180 |
| 5 | F + B + P | 51 | 43 | 94 | 6 | 0 | 0 | 6.8 | 17 | 215 |
| 6 | F + B + P | 39 | 47 | 86 | 14 | 0 | 0 | 4.9 | 19 | 160 |
| 7 | F + B + P | 61 | 19 | 80 | 20 | 0 | 0 | 3.5 | 28 | 165 |
| 8 | F + B + P | 58 | 33 | 91 | 9 | 0 | 0 | 5.5 | 16 | 151 |
| 9 | F + B + P | 61 | 24 | 85 | 15 | 0 | 0 | 8.1 | 35 | 234 |
| 10 | F + B + P | 48 | 39 | 87 | 13 | 0 | 0 | 4.9 | 42 | 190 |
| 11 | F + B + P | 57 | 34 | 91 | 9 | 0 | 0 | 5.8 | 22 | 272 |
| 12 | F + B + P | 55 | 32 | 87 | 11 | 2 | 0 | 5.1 | 17 | 157 |

| Steel pipe No. | Mechanical properties: YS (MPa) | TS (MPa) | YR (%) | Charpy absorbed energy at −40° C. (J) | 35t/D | Buckling start strain (%) | Remark |
|---|---|---|---|---|---|---|---|
| 1 | 457 | 526 | 86.9 | 143 | 2.05 | 2.7 | Invention example |
| 2 | 481 | 563 | 85.4 | 184 | 1.91 | 2.5 | Invention example |
| 3 | 493 | 570 | 86.5 | 108 | 1.75 | 2.4 | Invention example |
| 4 | 515 | 620 | 83.1 | 31 | 1.27 | 1.7 | Comparative example |

TABLE 3-continued

| | | | | | | | |
|---|---|---|---|---|---|---|---|
| 5 | 368 | 401 | 91.8 | 109 | 1.66 | 1.7 | Comparative example |
| 6 | 499 | 543 | 91.9 | 56 | 1.66 | 1.8 | Comparative example |
| 7 | 352 | 417 | 84.4 | 132 | 1.91 | 2.5 | Comparative example |
| 8 | 506 | 554 | 91.3 | 97 | 1.91 | 2.0 | Comparative example |
| 9 | 373 | 455 | 82.0 | 19 | 1.11 | 1.4 | Comparative example |
| 10 | 467 | 536 | 87.1 | 27 | 1.77 | 2.4 | Comparative example |
| 11 | 490 | 574 | 85.4 | 95 | 1.37 | 1.2 | Comparative example |
| 12 | 483 | 558 | 86.6 | 169 | 1.64 | 2.1 | Invention example |

The underlined values are outside the scope of the present invention.
*F: ferrite, P: pearlite, B: bainite, M: martensite, A: austenite In Table 3, Steel pipe Nos. 1 to 3 and 12 correspond to Invention examples, while Steel pipe Nos. 4 to 11 correspond to Comparative examples.

The chemical compositions of the electric resistance welded steel pipes prepared in Invention examples all contained C: 0.040% or more and 0.50% or less, Si: 0.02% or more and 2.0% or less, Mn: 0.40% or more and 3.0% or less, P: 0.10% or less, S: 0.050% or less, Al: 0.005% or more and 0.10% or less, and N: 0.010% or less, with the balance being Fe and incidental impurities. Furthermore, the steel microstructure included, by volume, ferrite: more than 30%, and bainite: 10% or more, and the total volume fraction of ferrite and bainite was 70% or more and 95% or less, with the balance being one or two or more phases selected from pearlite, martensite, and austenite. In addition, the average size of crystal grains (average equivalent circle diameter) was less than 7.0 μm, and the volume fraction of crystal grains having a size (equivalent circle diameter) of 40.0 μm or more was 30% or less. Moreover, the compressive residual stress generated in the inner and outer surfaces of the electric resistance welded steel pipe in the axial direction of the steel pipe was 250 MPa or less.

As for the mechanical properties of each of the electric resistance welded steel pipes prepared in Invention examples, the yield stress was 450 MPa or more, the yield ratio was 90% or less, the Charpy absorbed energy at −40° C. was 70 J or more, and the buckling start strain εc satisfied Formula (1).

In contrast, in Steel pipe No. 4, which is a comparative example where the C content was above the range according to aspects of the present invention, the total volume fraction of ferrite and bainite did not reach the intended value and, as a result, the Charpy absorbed energy at −40° C. did not reach the intended value.

In Steel pipe No. 5, which is a comparative example where the C content was below the range according to aspects of the present invention, the yield stress and the yield ratio did not reach the intended values.

In Steel pipe No. 6, which is a comparative example where the Si content was above the range according to aspects of the present invention, the yield ratio and the Charpy absorbed energy at −40° C. did not reach the intended values.

In Steel pipe No. 7, which is a comparative example where the Si content was below the range according to aspects of the present invention, the yield stress did not reach the intended value.

In Steel pipe No. 8, which is a comparative example where the Mn content was above the range according to aspects of the present invention, the yield ratio did not reach the intended value.

In Steel pipe No. 9, which is a comparative example where the Mn content was below the range according to aspects of the present invention, the average size of the crystal grains and the total volume fraction of crystal grains having a size of 40.0 μm or more did not reach the intended values and, as a result, the yield stress and the Charpy absorbed energy at −40° C. did not reach the intended values.

In Steel pipe No. 10, which is a comparative example where the total rolling reduction ratio at 930° C. or less was low, the total volume fraction of crystal grains having a size of 40.0 μm or more did not reach the intended value and, as a result, the Charpy absorbed energy at −40° C. did not reach the intended value.

In Steel pipe No. 11, which is a comparative example where the diameter reduction performed in the sizing step was low, the compressive residual stress did not reach the intended value and, as a result, the buckling start strain did not reach the intended value.

REFERENCE SIGNS LIST

1 BASE METAL ZONE
2 WELDED HEAT AFFECTED ZONE
3 MOLTEN AND SOLIDIFIED ZONE

The invention claimed is:

1. An electric resistance welded steel pipe comprising a base metal zone and an electric resistance welded zone, the base metal zone comprising:

a chemical composition containing, by mass,

C: 0.040% or more and 0.50% or less,

Si: 0.02% or more and 2.0% or less,

Mn: 0.40% or more and 3.0% or less,

P: 0.10% or less,

S: 0.050% or less,

Al: 0.005% or more and 0.10% or less, and

N: 0.010% or less, with the balance being Fe and incidental impurities; and a steel microstructure having:

by volume, ferrite: more than 30%, and bainite: 10% or more, a total volume fraction of the ferrite and the bainite being 70% or more and 95% or less, with the balance being one or two or more phases selected from pearlite, martensite, and austenite; and when regions surrounded by boundaries between adjacent crystals having a misorientation of 15° or more are defined as crystal grains, an average size of the crystal grains is less than 7.0 μm, and a volume fraction of crystal grains having a size of 40.0 μm or more is 30% or less;

wherein a compressive residual stress generated in inner and outer surfaces of the electric resistance welded steel pipe in an axial direction of the electric resistance welded steel pipe is 250 MPa or less.

2. The electric resistance welded steel pipe according to claim 1, wherein the chemical composition further contains one or two or more elements selected from, by mass, Nb: 0.15% or less,
V: 0.15% or less,
Ti: 0.15% or less,
Cu: 1.0% or less,
Ni: 1.0% or less,
Cr: 1.0% or less,
Mo: 1.0% or less,
Ca: 0.010% or less, and
B: 0.0050% or less.

3. The electric resistance welded steel pipe according to claim 1, having a wall thickness of more than 17 mm and 30 mm or less.

4. The electric resistance welded steel pipe according to claim 2, having a wall thickness of more than 17 mm and 30 mm or less.

5. The electric resistance welded steel pipe according to claim 1, having an axial compression property satisfying Formula (1) belo,.

$$\varepsilon c \geq 35 \times t/D \quad (1)$$

where, in Formula (1), ac represents a strain (%) at which a compressive load applied in an axial compression test reaches a peak; D represents an outside diameter (mm), and t represents a wall thickness (mm).

6. The electric resistance welded steel pipe according to claim 2, having an axial compression property satisfying Formula (1) below, $$\varepsilon c \geq 35 \times t/D \quad (1)$$

where, in Formula (1), εc represents a strain (%) at which a compressive load applied in an axial compression test reaches a peak; D represents an outside diameter (mm), and t represents a wall thickness (mm).

7. The electric resistance welded steel pipe according to claim 3, having an axial compression property satisfying Formula (1) below, $$\varepsilon c \geq 35 \times t/D \quad (1)$$

where, in Formula (1), εc represents a strain (%) at which a compressive load applied in an axial compression test reaches a peak; D represents an outside diameter (mm), and t represents a wall thickness (mm).

8. The electric resistance welded steel pipe according to claim 4, having an axial compression property satisfying Formula (1) below, $$\varepsilon c \geq 35 \times t/D \quad (1)$$

where, in Formula (1), εc represents a strain (%) at which a compressive load applied in an axial compression test reaches a peak; D represents an outside diameter (mm), and t represents a wall thickness (mm).

9. A method for producing an electric resistance welded steel pipe according to claim 1, the method comprising:

forming a hot rolled steel sheet having the chemical composition into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

10. A method for producing an electric resistance welded steel pipe according to claim 2, the method comprising:

forming a hot rolled steel sheet having the chemical composition into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

11. A method for producing an electric resistance welded steel pipe according to claim 1, the method comprising:

heating a steel material having the chemical composition to a heating temperature of 1100° C. or more and 1300° C. or less;

hot rolling the steel material at a rough rolling delivery temperature of 850° C. or more and 1150° C. or less and a finish rolling delivery temperature of 750° C. or more and 850° C. or less, such that a total rolling reduction ratio at 930° C. or less is 65% or more;

then performing cooling at an average cooling rate of 10° C./s or more and 30° C./s or less and a cooling stop temperature of 450° C. or more and 650° C. or less, in terms of a temperature of the center of a steel sheet in a thickness direction of the steel sheet;

subsequently performing coiling at a coiling temperature of 450° C. or more and 650° C. or less to prepare a hot rolled steel sheet;

forming the hot rolled steel sheet into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

12. A method for producing an electric resistance welded steel pipe according to claim 2, the method comprising:

heating a steel material having the chemical composition to a heating temperature of 1100° C. or more and 1300° C. or less;

hot rolling the steel material at a rough rolling delivery temperature of 850° C. or more and 1150° C. or less and a finish rolling delivery temperature of 750° C. or more and 850° C. or less, such that a total rolling reduction ratio at 930° C. or less is 65% or more;

then performing cooling at an average cooling rate of 10° C./s or more and 30° C./s or less and a cooling stop temperature of 450° C. or more and 650° C. or less, in terms of a temperature of the center of a steel sheet in a thickness direction of the steel sheet;

subsequently performing colling at a coiling temperature of 450° C. or more and 650° C. or less to prepare a hot rolled steel sheet;

forming the hot rolled steel sheet into a hollow-cylindrical shape by cold roll forming and subsequently performing electric resistance welding to prepare an electric resistance welded steel pipe; and reducing a diameter of the electric resistance welded steel pipe such that a circumference of the steel pipe reduces by 0.30% or more and 2.0% or less.

13. A structure comprising the electric resistance welded steel pipe according to claim 1, wherein the structure is one of a line pipe and a building structure.

14. A structure comprising the electric resistance welded steel pipe according to claim 2, wherein the structure is one of a line pipe and a building structure.

15. A structure comprising the electric resistance welded steel pipe according to claim 3, wherein the structure is one of a line pipe and a building structure.

16. A structure comprising the electric resistance welded steel pipe according to claim 4, wherein the structure is one of a line pipe and a building structure.

17. A structure comprising the electric resistance welded steel pipe according to claim 5, wherein the structure is one of a line pipe and a building structure.

18. A structure comprising the electric resistance welded steel pipe according to claim 6, wherein the structure is one of a line pipe and a building structure.

19. A structure comprising the electric resistance welded steel pipe according to claim 7, wherein the structure is one of a line pipe and a building structure.

20. A structure comprising the electric resistance welded steel pipe according to claim 8, wherein the structure is one of a line pipe and a building structure.

21. The electric resistance welded steel pipe according to claim 1, wherein a yield stress of the electric resistance welded steel pipe is 380 MPa or more.

22. The electric resistance welded steel pipe according to claim 1, wherein a yield stress of the electric resistance welded steel pipe is 450 MPa or more.

23. The electric resistance welded steel pipe according to claim 1, wherein the chemical composition contains C: 0.125% or more and 0.50% or less.

24. The electric resistance welded steel pipe according to claim 1, wherein a tensile strength of the electric resistance welded steel pipe is 570 MPa or less.

* * * * *